Patented Aug. 14, 1928.

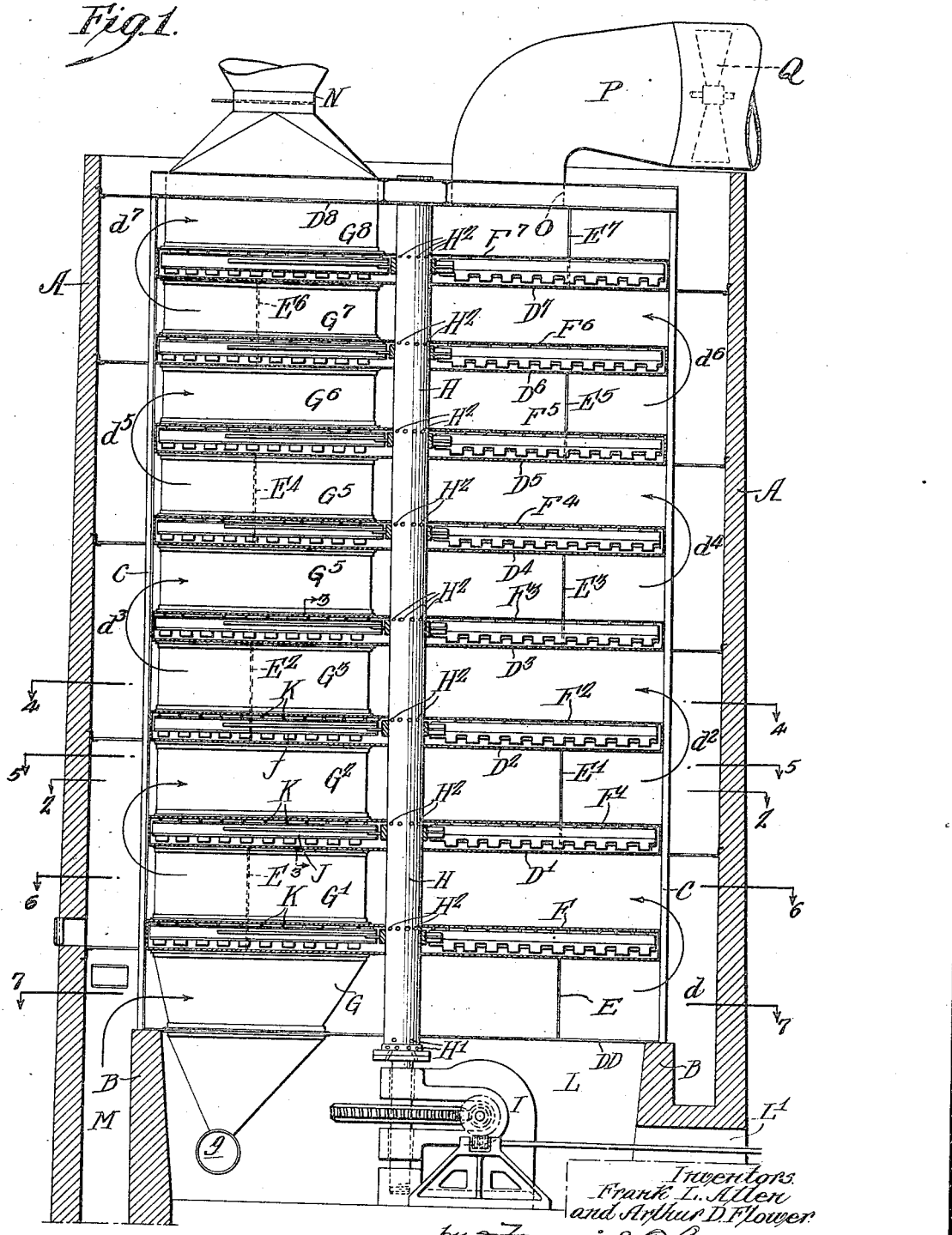

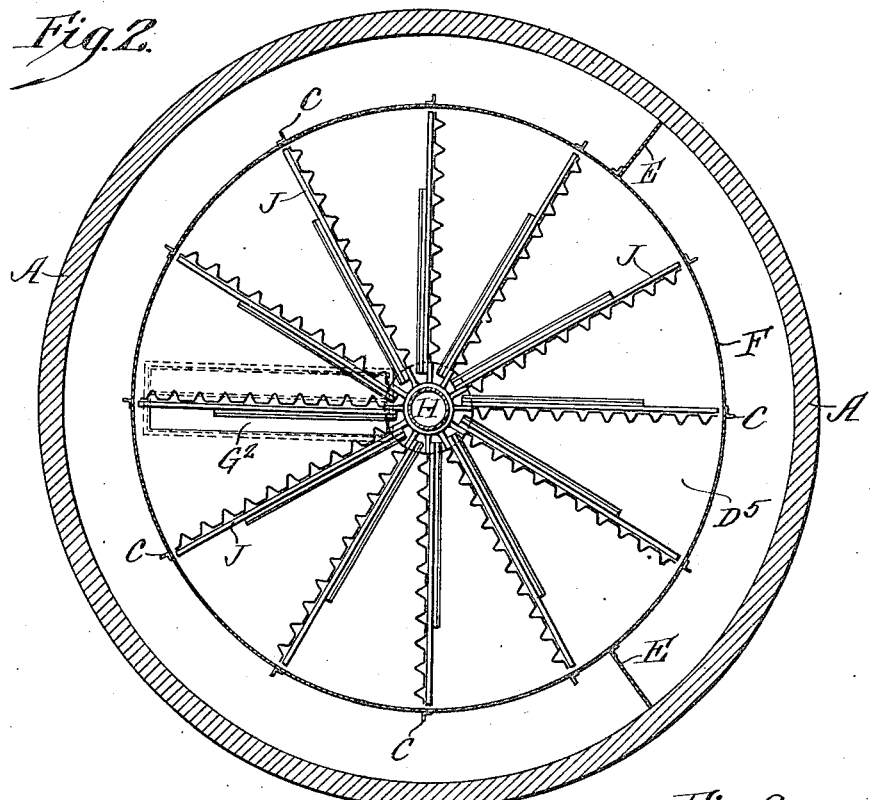

1,680,274

UNITED STATES PATENT OFFICE.

FRANK L. ALLEN, OF MONTCLAIR, NEW JERSEY, AND ARTHUR D. FLOWER, OF WILMINGTON, DELAWARE, ASSIGNORS TO EDGE MOOR IRON COMPANY, OF EDGE MOOR, DELAWARE.

DRYING APPARATUS.

Application filed March 7, 1927, Serial No. 173,373, and in Cuba March 2, 1926.

Our invention relates to drying apparatus especially designed for drying bagasse but capable of application to drying other substances.

The objects of our invention are to provide in an apparatus comprising a multiple series of drying apparatus and means for heating them externally and for delivering material from one to the other progressively downward, means for drawing off from the chambers the steam and gases generated therein and, preferably, means for introducing air or gas into the separate chambers to aid in sweeping the steam and gas out of the chambers. Another feature of our invention is to combine with the heating chambers a heating flue enclosing the chambers, of progressively contracting area so as to maintain the heating gases at an approximation to constant velocity as they contract on cooling. Other features of our invention will be best explained in connection with the drawings which show a drying apparatus embodying our invention and in which Figure 1 is a sectional elevation of our apparatus.

Figure 2, a cross section on line 2—2 of Fig. 1.

Figure 3 a diagrammatic view showing how the chutes connecting the drying chambers are inclined and Figures 4, 5, 6 and 7 are views corresponding to sections 4—4, 5—5, 6—6 and 7—7 of Fig. 1, and showing the construction of the plates and baffles which divide the heating tower and the space between the chambers into a tortuous heating flue.

A is a vertical cylindrical tower through which heating gases, preferably waste heat gases, introduced through conduit M pass upward and are drawn off at P by a fan indicated at Q. B is a cylindrical foundation wall supporting the series of angle irons C—C, etc., which in turn support the drying chambers K, K, K, etc. These chambers are cylindrical and their bottoms are formed by the plates D, D¹, D², etc., which for the greater part of their circumference extend across the space between the chambers and the wall of the tower and are formed with openings $d$, $d^1$, $d^2$, etc. lying between the baffles E, E, E¹, E¹, etc., which extend between each heating chamber and the wall of the tower and upward to the next bottom plate as shown. The openings $d$, $d^1$, $d^2$, etc. are disposed alternately on opposite sides of the tower so as to divide the tower and the spaces between the chambers into a tortuous flue which as the chambers and their bottom plates are spaced closer together in an upward direction contracts in area so as to maintain an approximation to uniform velocity in the heating gases as they contract by cooling.

The chambers are connected in series by chutes G¹, G², G³, etc., which are radially disposed and are long and relatively narrow with their length lying parallel to the direction of gas flow in the flow spaces between the chambers. These chutes are also given a slant so that material passing from an upper to a lower chamber is delivered to one side of the chute opening leading from such lower chamber.

H is a hollow shaft driven by the gearing indicated at I and passing through the centers of the drying chambers and sweeps J secured to the shaft operate to carry the material being dried around on the bottoms of the chambers. Openings H¹ in the lower part of the hollow shaft serve for the admission of air and openings H² through the shaft serve to deliver air into each drying chamber,-K, K, K, etc. Openings lead through the walls of the chambers into the surrounding flue spaces through which openings steam, gas, and air can flow from the chamber into the flue.

N is a chute for the delivery of bagasse to the upper drying chamber.

In operation, bagasse is delivered through chute N to drying chamber F⁷, carried over its floor plate to chute G⁷ by the sweeps J and delivered to the next lower chamber and so on until the dried bagasse is delivered through chute G to conveyor $g$. The heating gases enter at M and by the suction of fan Q are drawn through the tortuous contracting flue in contact with the drying chambers. Steam and gas escape from the drying chambers into the flue through openings K and their elimination is aided by the air flowing through the hollow shafts into the chambers through openings H².

Having now described our invention, what we claim as new and desire to secure by Letters Patent is:

1. Drying apparatus comprising a series of cylindrical drying chambers arranged one above the other and separated by spaces interconnected to form a flue for heating gases, long and radially arranged delivery conduits connecting the drying chambers, means for sweeping the material to be dried over the floor of each chamber, a heating gas flue comprising as a part thereof the spaces separating the drying chambers and vent openings for steam and gas leading from the drying chambers into the heating flue.

2. The apparatus of claim 1, further characterized by having the radially arranged conduits connecting the heating chambers disposed so as to be parallel to the direction of heating gas flow through the flue spaces separating the chambers.

3. The apparatus of claim 1, further characterized by having the radially arranged conduits connecting the heating chambers arranged at an angle to the perpendicular and disposed so as to be parallel to the direction of heating gas flow through the flue spaces separating the chambers.

4. The apparatus of claim 1, further characterized by having an air delivery conduit connected to each drying chamber.

5. The apparatus of claim 1, further characterized by having the flue spaces between the drying chambers of progressively decreasing height from the bottom of the apparatus upward so as to maintain an approximation to a uniform flow of speed of gases as they cool and contract in volume.

6. Drying apparatus comprising in combination a vertical tower, a series of cylindrical drying chambers of less diameter than the interior of the tower arranged one above the other in said tower separated by spaces which decrease progressively from the bottom upward, partition plates extending from the bottom of the drying chamber into the space between the chambers and the tower forming with the spaces between the chambers a flue for heating gases, radially disposed conduits connecting the heating chambers and extending through the spaces between the chambers in the direction of the flow of gases through said spaces, means for sweeping the material to be dried over the floors of the drying chambers, means for supplying air to the drying chambers and vents leading from the chambers into the flue spaces of the tower.

FRANK L. ALLEN.
ARTHUR D. FLOWER.